(12) United States Patent
Wager et al.

(10) Patent No.: US 6,519,223 B1
(45) Date of Patent: Feb. 11, 2003

(54) SYSTEM AND METHOD FOR IMPLEMENTING A SEMI RELIABLE RETRANSMISSION PROTOCOL

(75) Inventors: Stefan Henrik Andreas Wager, Helsinki (FI); Reiner Ludwig, Kensington, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/287,392

(22) Filed: Apr. 6, 1999

(51) Int. Cl.[7] .............................................. H04L 1/18
(52) U.S. Cl. ....................................... 370/216; 714/749
(58) Field of Search ................................. 370/469, 389, 370/395, 278, 216; 714/748, 749, 750

(56) References Cited

U.S. PATENT DOCUMENTS

| | | | |
|---|---|---|---|
| 5,222,061 A | 6/1993 | Doshi et al. ................... 370/13 |
| 5,684,791 A | * 11/1997 | Raychaudhuri et al. ..... 370/278 |
| 5,754,754 A | 5/1998 | Dudley et al. ......... 395/182.16 |
| 6,198,746 B1 | * 3/2001 | Saito .......................... 370/398 |
| 6,256,300 B1 | * 7/2001 | Ahmed et al. .............. 370/331 |
| 6,424,625 B1 | * 7/2002 | Larsson et al. ............. 370/236 |

FOREIGN PATENT DOCUMENTS

EP   1 006 689 A2   6/2000

* cited by examiner

*Primary Examiner*—Ken Vanderpuye
(74) *Attorney, Agent, or Firm*—Jenkens & Gilchrist, P.C.

(57) ABSTRACT

A telecommunications system and method is disclosed for implementing a semi-reliable retransmission protocol that utilizes both selective repeat Automatic Repeat Request (ARQ) and segmentation and assembly of data packets. The new semi-reliable retransmission protocol includes a timer based triggering of a retransmission timeout for retransmission protocols, which allows the retransmission timeout to become insensitive to variations in the channel rate. In addition, the retransmission timeout can be defined based upon the maximum delay allowable for the retransmission of corrupted data packets over the air interface. For every data packet received a timer monitoring the transmission time of the data packet is initialized. If the timer elapses for the data packet this data packet is marked as discarded in the transmitter, and a request is sent to the receiver to ensure that transmissions carrying that data packet are discarded in the receiver.

37 Claims, 5 Drawing Sheets

SYSTEM AND METHOD FOR IMPLEMENTING A SEMI RELIABLE RETRANSMISSION PROTOCOL

BACKGROUND OF THE PRESENT INVENTION

1. Field of the Invention

The present invention relates generally to cellular telecommunications systems and methods for transmitting data packets between a transmitter and a receiver over an air interface, and specifically to providing reliable transmission of the data packets over the air interface.

2. Background and Objects of the Present Invention

There are many applications where large volumes of digital data must be transmitted and received in a substantially error free manner. In telecommunications and satellite communications systems, in particular, it is imperative that the transmission of digital data over the air interface be completed in as accurate a manner as is possible. Accurate transmission and reception of digital data has, however, been difficult because the communications channels utilized for data transmissions over the air interface are plagued by error introducing factors. For example, such errors may be attributable to transient conditions in the channel, such as noise and distortion, or they may be due to recurrent conditions attributable to defects in the channel. The existence of transient conditions or defects results in instances where the digital data is not transmitted properly or cannot be reliably received.

Digital data is often transmitted in packets (or blocks or frames), in which each packet includes a number of information bytes followed by a frame check sequence of bits. The errors that typically occur in the transmission and reception of digital data are of two types: "random" channel errors and "burst" channel errors. Random channel errors occur when the value of a single bit has been altered, while burst channel errors occur when the values of a continuous sequence of adjacent bits have been altered. The frame check sequence included in each data packet is used to detect when and where a channel error has been introduced into the data packet.

Considerable attention has been directed toward discovering methods for addressing the problems concerning errors which typically accompany data transmission activities over the air interface. For example, two common techniques of error correction include Forward Error Correction (FEC) and Automatic Repeat Request (ARQ). The FEC error correction technique adds redundant information in the transmitter, which is used by the receiver to correct transmission errors, whereas in the (ARQ) error correction technique, the receiver requests retransmission of data packets not correctly received from the transmitter. Typically, a combination of FEC and ARQ techniques are applied to recover from transmission errors. The applied ratio of FEC verses ARQ depends upon the type of data being transmitted. For instance, real time data with strong requirements on small delay, such as voice, are normally carried with only FEC. On the other hand, for data with loose requirements with respect to delay, such as file transfers, usually a combination of FEC and ARQ is applied to maximize the probability of correct delivery.

When examining existing data applications, different needs of transmission reliability can be observed. For instance, a file transfer application needs a transmission with high reliability, whereas an application transferring information of more temporary importance may only need moderate transmission reliability. If the high reliability and moderate reliability applications are retransmitted the same number of times, the retransmission of the moderate reliability application may utilize the channel capacity needed for retransmission of more important data. In addition, in the Internet, there is an increasing amount of applications exchanging information of time bounded importance. Examples include stock quota broadcast applications and interactive video games, in which position updating data is exchanged between players.

The degree of reliability of a cellular service using both FEC and ARQ is currently regulated by the number of retransmissions allowed before a data packet is dropped. For example, currently in the Global System for Mobile Communications (GSM) system, when a retransmission counter exceeds a predefined value, both the receiver and the transmitter will empty their entire buffers and all counters and timers are re-initialized. The GSM retransmission timeout mechanism is insufficient for many applications that require high reliability of data because all data packets are lost upon retransmission timeout, including those data packets that were correctly received but were out of sequence. Yet another approach is the approach taken for the IS-95 version of the Radio Link Protocol. In that approach, data packets are retransmitted twice at the most. Thereafter, the receiver releases whatever it has (whether corrupted or not) to the transmitter. In a system with variable rate channels, such as most packet-based systems, the number of allowed retransmissions does not translate directly to a finite delay. Thus, there arises a need to set the level of transmission reliability for cellular services, in order to optimally transmit data packets over the air interface.

It is, therefore, an object of the present invention to set transmission reliability for retransmission protocols.

SUMMARY OF THE INVENTION

A preferred embodiment of the present invention is directed to telecommunications systems and methods for implementing a semi-reliable retransmission protocol that utilizes both selective repeat ARQ error correction and segmentation and assembly of data packets. This novel semi-reliable retransmission protocol includes a discard timer for triggering a retransmission timeout. Thus, the retransmission timeout becomes insensitive to variations in the channel rate and is capable of being defined based upon the maximum delay allowable for the retransmission of corrupted data packets over the air interface. For every data packet received by the transmitter a discard timer monitoring the transmission time of the data packet is initialized. If the discard timer elapses during the transmission of the data packet, this data packet is marked as discarded in the transmitter, and a "move receiving window" request message is sent to the receiver to ensure that transmissions received by the receiver that carry that data packet are discarded in the receiver. The value for the discard timer can be set in various ways, depending upon the Quality of Service (QoS) levels in the network. In one embodiment of the present invention, the discard timer value can be set according to the maximum delay allowable for the type of data included within the packet.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The Open Systems Interconnection (OSI) model was developed in the early 1980's by the International Standards Organization (ISO) for use in mainframe environments. This protocol provides the procedures and mechanisms necessary for mainframe computers to communicate with other devices, including terminals and modems. The OSI model divides data transmission into three distinct functions (process, transport and network) to carry out an application, which can be, for example, a file transfer or a voice transmission. The process function uses protocols which are unique to the application that uses them, while the transport function interfaces with the process function to provide reliable data transmission over the network. For example, the transport function provides error detection and correction, as well as other tasks such as sequencing of segments of data. Finally, the network function provides the mechanisms for actually routing the data over the network to the destination node.

Figure 1:
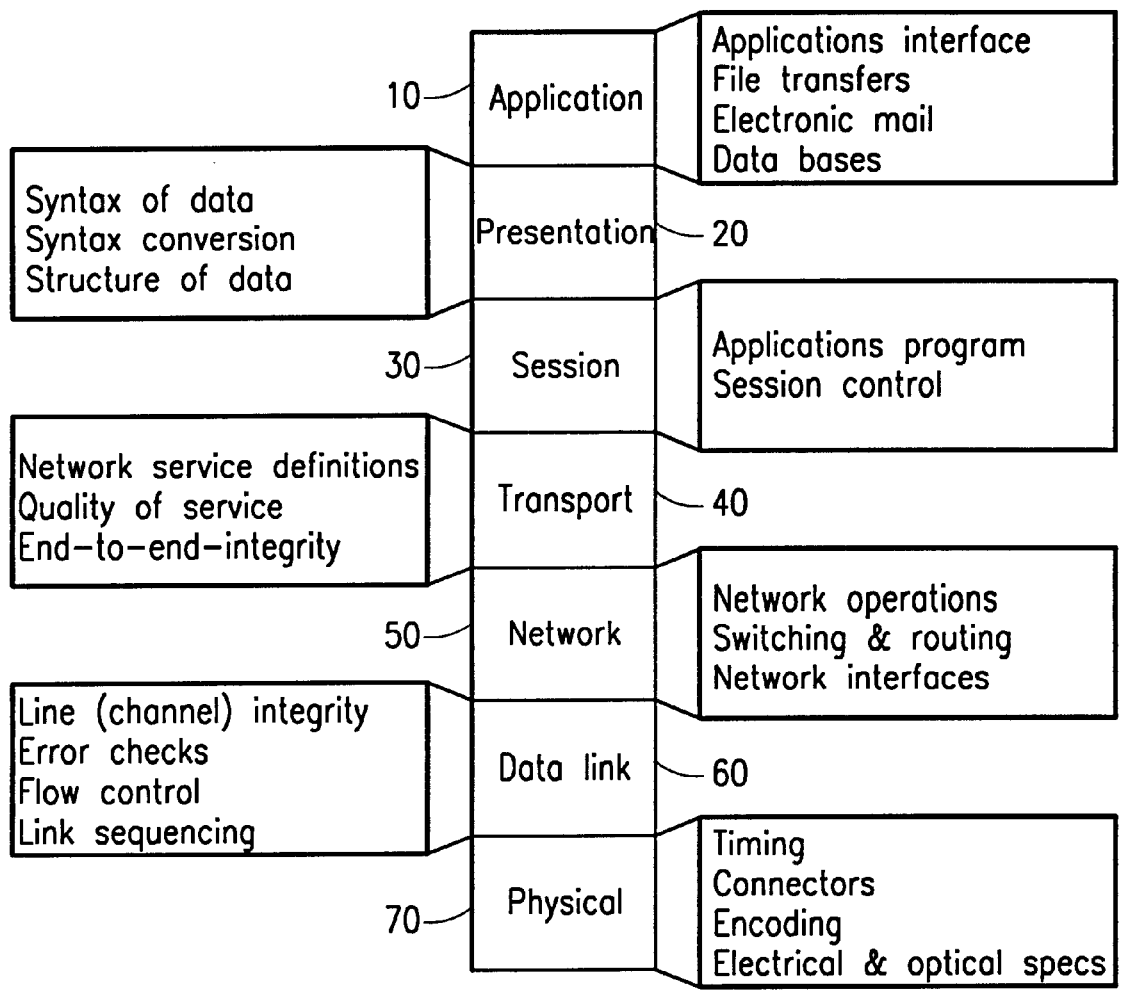
FIG. 1 is a block diagram illustrating the seven layers forming the Open Systems Interconnection model.

With reference now to FIG. 1 of the drawings, the OSI model addresses the process function, the transport function and the network function, and divides these functions into seven different layers: application 10, presentation 20, session 30, transport 40, network 50, data link 60 and physical 70. Each layer provides a service to the layer above and below it. For example, the physical layer 70 provides a service to the data link layer 60, which, in turn, provides a service to the network layer 50 and the physical layer 70, and so on. However, each layer is independent, and therefore, should the function change at any one layer, it will not impact the function of the other layers.

Figure 2:
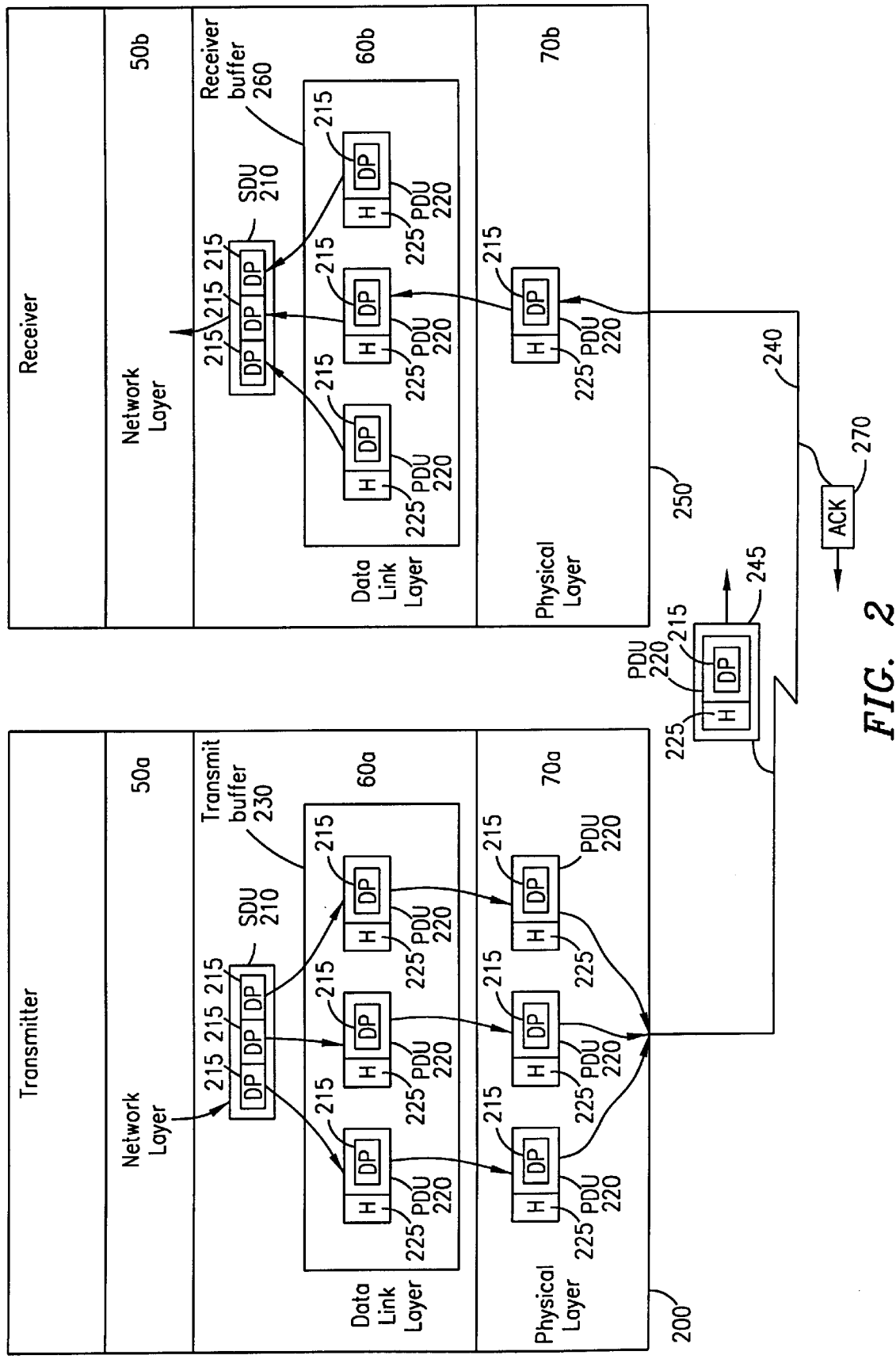
FIG. 2 is a block diagram illustrating the transmission of data packets from a transmitter to a receiver over the air interface.

The physical layer 70, which is the bottom layer, is the layer responsible for converting the digital data into a bit stream for transmission over the network. The data link layer 60 provides reliable communications between two devices, such as a transmitter and a receiver. For example, with reference now to FIG. 2 of the drawings, when data is to be transmitted from a transmitter 200 to a receiver 250 over an air interface 240, the network layer 50a in the transmitter 200 passes a service data unit (SDU) 210, which is typically composed of several data packets 215, to the data link layer 60a in the transmitter 200. The data link layer 60a in the transmitter 200 segments the SDU 210 into multiple protocol data units (PDUs) 220, which have a predefined short length, e.g., 40 bytes, as compared to the length of the SDUs 210, e.g., 1500 bytes. These PDUs 220 are stored in a transmit buffer 230 in the data link layer 60a, and passed to the physical layer 70a in the transmitter 200 for conversion of the digital data in the PDUs 220 into a bit stream for transmission over the air interface 240 to the physical layer 70b in the receiver 250.

It should be understood that the term PDU 220 refers S to a data unit used for peer-to-peer communication between two protocol peers, such as the data link layer 60a of the transmitter 200 and the data link layer 60b of the receiver 250, whereas an SDU 210 refers to the data unit received from a higher layer, such as the network layer 50a. Thus, when the data link layer 60a of the transmitter 200 receives the SDU 210 from the network layer 50a and segments the SDU 210 into multiple PDUs 220, the data link layer 60a adds header information 225 to each of the PDUs 220 for use by the data link layer 60b of the receiver 250 in re-assembling the PDUs 220 into the SDU 210, which can then be passed on to the network layer 50b of the receiver 250.

When the physical layer 70a of the transmitter 200 transmits the PDUs 220 containing the data 215 over the air interface 240 to the receiver 250, the communications channel 245 between the transmitter 200 and receiver 250 used to transmit the data 215 may introduce a number of errors into the transmitted data 215. Several different types of error detection and correction techniques can be utilized by the transmitter 200 and receiver 250 to prevent data 215 loss.

For example, the physical layer 70b of the receiver can first apply Forward Error Correction (FEC) to attempt to correct transmission errors. However, after FEC, if an error is discovered in one of the PDUs 220 by the physical layer 70b of the receiver 250, the corrupt PDU 220 is discarded. Thereafter, the data link layer 60b detects the loss of the corrupt PDU 220 by checking the sequence numbers of received PDUs 220, and stores correctly received PDUs 220 associated with the SDU 210 containing the corrupt PDU 220 in a receiver buffer 260. Subsequently, the data link layer 60b attempts to correct the error, using, for example, the Automatic Repeat Request (ARQ) technique. In the ARQ technique, the data link layer 60b of the receiver 250 requests retransmission by the data link layer 60a of the transmitter 200 of PDUs 220 not correctly received by the receiver 250. If, and when, a PDU 220 is correctly received, the data link layer 60b of the receiver 250 transmits an acknowledgment message 270 to the data link layer 60a of the transmitter 200, informing the transmitter 200 that the PDU 220 was correctly received. It should be understood that the combination of FEC and ARQ error detection and correction techniques discussed above can be modified depending upon the network operator.

If some form of ARQ is utilized, and if a particular PDU 220 is not received correctly by the data link layer 60b of the receiver 250, many existing systems place limits on the number of times that particular PDU 220 can be retransmitted, in order to prevent unnecessary delays in transmission of the remaining data 215. For example, in the GSM, when a retransmission counter exceeds a predefined value, both the receiver 250 and the transmitter 200 empty their respective entire buffers 230 and 260. In addition, in the General Packet Radio Services (GPRS) system, a timer is initialized whenever a send window is stalled. Upon expiration of that timer, the data link layer 60 context is terminated and reestablished. Furthermore, in an IS-95 system, data link layer PDUs 220 are retransmitted at most twice, and after the second retransmission, the receiver 250 releases the PDU 220 (whether corrupted or not) to the network layer 50b. However, in each of the aforementioned retransmission systems, the retransmission is discontinued after a fixed number of retransmissions, instead of on the basis of the amount of delay introduced by retransmitting a particular SDU 210 (taking into account the importance of the SDU 210), In addition, the GSM and IS-95 systems are not aware of SDU 210 boundaries. Therefore, in the GSM and IS-95 systems, the data link layer 60a of the transmitter 200 might resume transmission again in the middle of an SDU 210, even though one of the PDUs 220 in the SDU 210 is corrupt.

Figure 3:
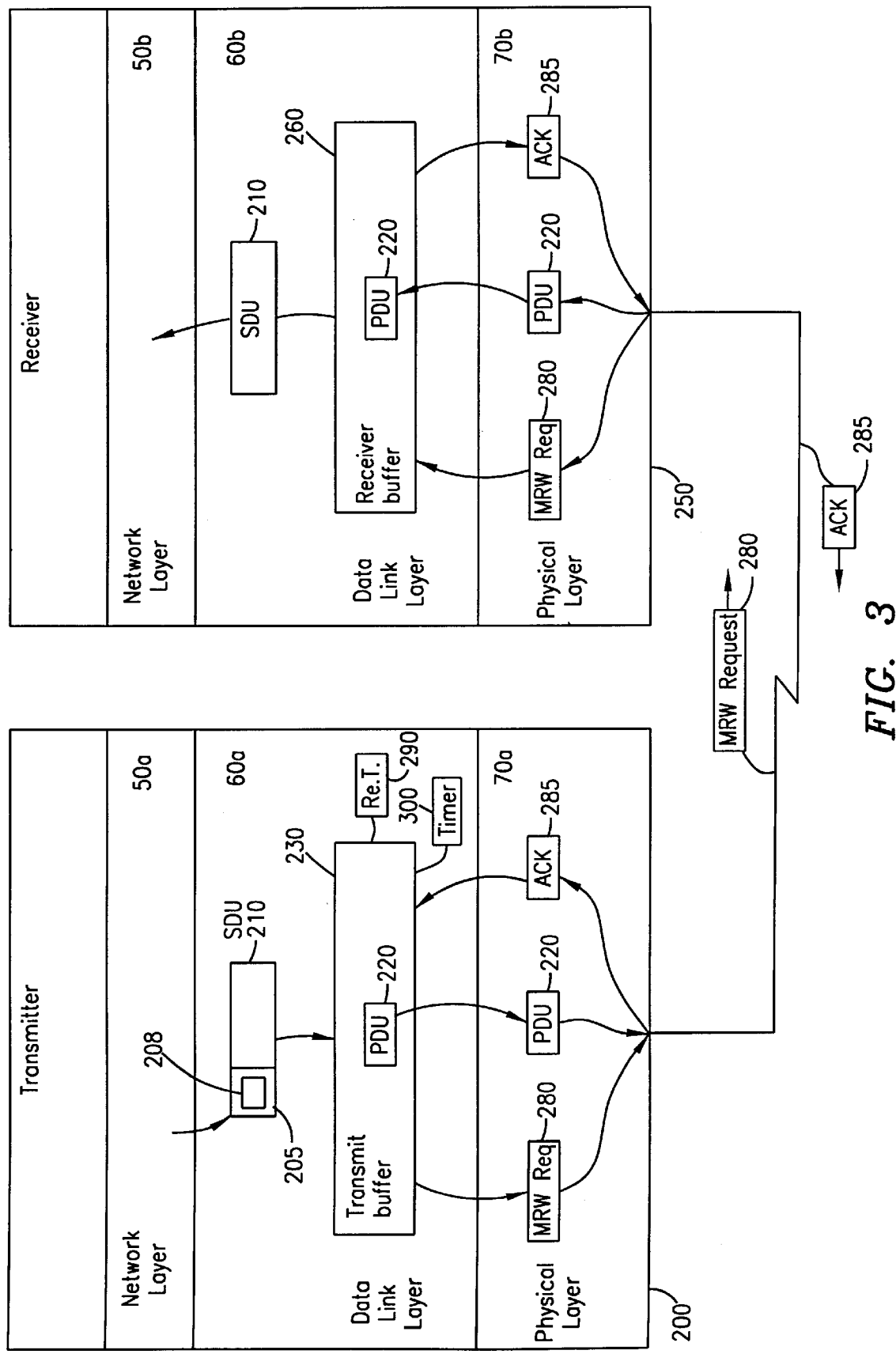
FIG. 3 illustrates a semi-reliable retransmission protocol utilizing a timer-based triggering of retransmission timeout in accordance with preferred embodiments of the present invention.

Therefore, with reference now to FIG. 3 of the drawings, in accordance with preferred embodiments of the present invention, a novel semi-reliable retransmission protocol can be implemented that includes a discard timer 300 within the transmitter 200 for triggering retransmission timeout. This new semi-reliable retransmission protocol can be used by systems implementing both ARQ error correction and segmentation and assembly of SDUs 210, as described above in connection with FIG. 2 of the drawings. However, it should be noted that the particular combination of FEC and ARQ techniques that this new semi-reliable retransmission protocol can be implemented with is not limited to the combinations discussed herein.

The value of the new discard timer 300 can be set in various ways, depending upon the Quality of Service (QoS) levels in the system implementing the new timer 300. Preferably, the new discard timer 300 is set according to the maximum delay allowable for the type of data 215 included in the SDU 210. For example, if two applications send respective data 215 within respective SDUs 210, and one of the applications has a higher priority than the other application, an SDU 210 sent by the higher priority application may have a longer discard timer 300 value than an SDU 210 sent by the other application. Alternatively, assuming a delay parameter (not shown) is assigned to each connection in the system, this delay parameter could be used to set the default value for the discard timer 300. Accordingly, the retransmission timeout is insensitive to variations in the channel rate, and is based upon an exact definition of the maximum allowable delay for the SDU 210.

For every SDU 210 received by the data link layer 60a in the transmitter 200 from a higher layer, e.g., the network layer 50a, segmented into at least one PDU 220 and stored in the transmit buffer 230, the new discard timer 300 (which monitors the transmission time of the SDU 210) is initialized. In preferred embodiments, a dedicated field 208 containing the value of the timer 300 can be included in a header 205 of the SDU 210. This value can be set, for example, by the application that is sending the SDU 210. If the discard timer 300 elapses for a particular SDU 210, this particular SDU 210 is marked as discarded in the transmit buffer 230 of the transmitter 200, and a "move receiving window" request message 280 is sent to the data link layer 60b of the receiver 250 to ensure that PDUs 220 received by the receiver 250 that carry that particular SDU 210 are discarded in the receiver buffer 260 of the receiver 250 as well. For example, all PDUs 220 carrying segments of that discarded SDU 210 can be emptied from the receiver buffer 260, except the first and last PDU 220, if those PDUs 220 include segments of other SDUs 210. Thus, the data link layer 60b of the receiver will no longer request retransmission of any PDUs 220 within the discarded SDU 210.

It should be noted that for retransmission protocols that support concatenation of several SDUs 210 into one PDU 220, PDUs 220 carrying segments of other SDUs 210 that have not timed out, shall not be discarded. In addition, in order to prevent lost "move receiving window" request messages 280, the receiver 250 can send an acknowledgment message 285 to the transmitter 200 after successfully receiving the "move receiving window" request message 280. In addition, the transmitter 200 can implement a corresponding retransmission timer 290. If the retransmission timer 290 times out before the acknowledgment message 285 is received, the transmitter 200 can transmit another "move receiving window" request message 280 to the receiver 250. Alternatively, the status of valid PDUs 220 versus PDUs 220 that should be discarded at the receiver 250 could be constantly announced by the transmitter 200, e.g., by piggy-backing that information onto later sent PDUs 220.

In an alternative embodiment, the boundaries of application layer data units (ADUs) (not shown), which include data 215 on the application layer 10, can be encoded into the headers 205 of the SDUs 210. ADUs are typically segmented into or concatenated onto one or more SDUs 210. Therefore, by encoding the ADU boundaries into the headers 205 of the SDUs 210, the system can assign "time to live" values to ADUs, which can potentially span over multiple SDUs 210. This "time to live" value can be encoded in the dedicated field 208 of the SDU header 205 to initialize the discard timer 300. In addition, the data link layer 60 can store all PDUs 220 belonging to the same ADU within the buffers 230 and 260. Thus, instead of discarding all PDUs 220 that belong to a particular corrupted SDU 210, the data link layer 60 can discard all PDUs 220 belonging to a particular ADU at the expiration of the "time to live" value, which allows the semi-reliable retransmission protocol to be context-sensitive to the ADU boundary markings in the respective SDUs 210.

In addition, in a further alternative embodiment, for connections using differential header compression algorithms, unnecessary re-synchronization of the compressor and de-compressor can be avoided by including the compressed header (which is the network layer 50 header) without the corresponding data, in the "move receiving window" request message 280. The relatively small size of the compressed header will add little overhead to the "move receiving window" request message 280, but the throughput will be improved because the exchange of re-synchronization information has been avoided.

Figure 4:
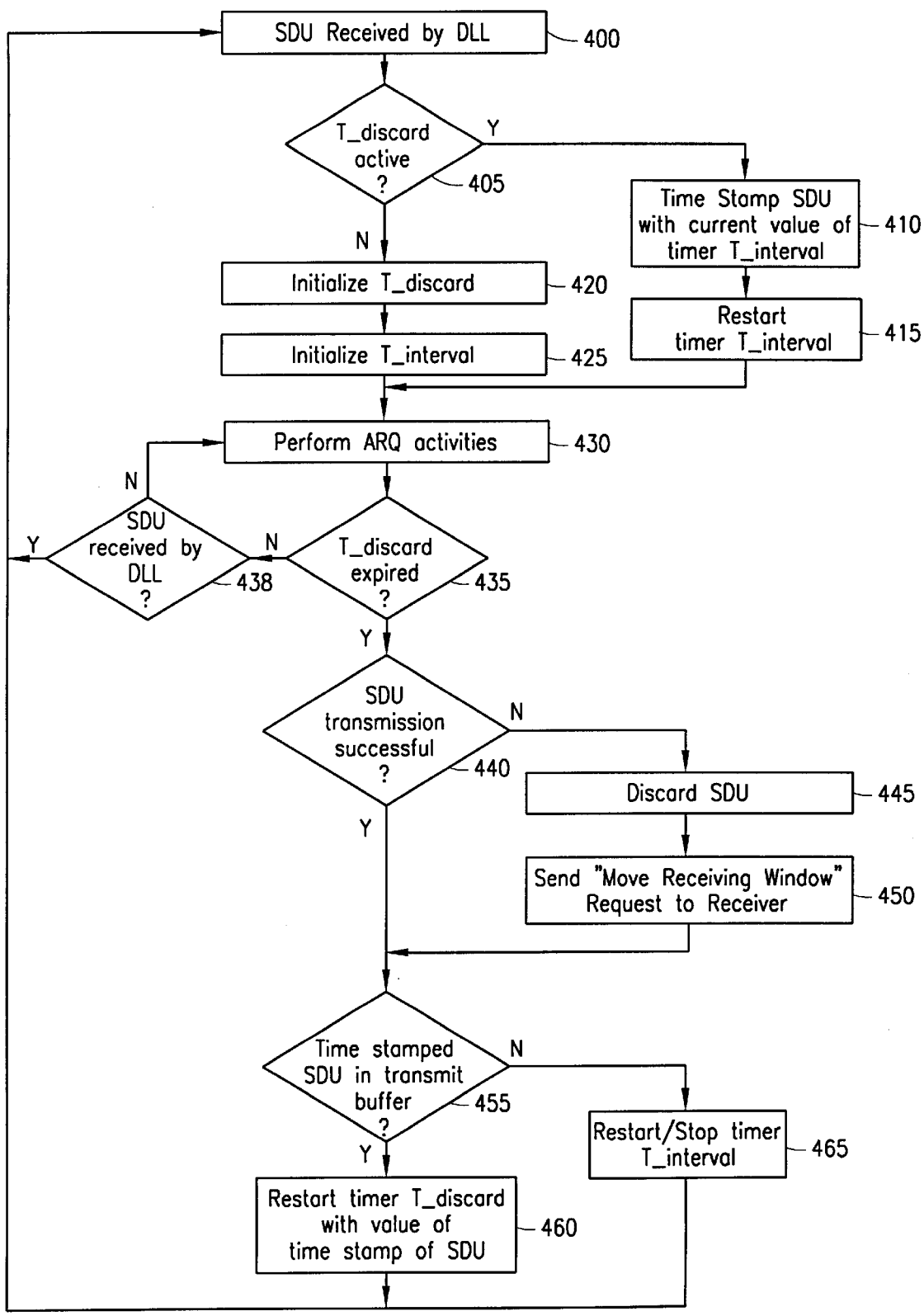
FIG. 4 is a flow chart illustrating steps in a sample implementation of the semi-reliable retransmission protocol of the present invention.

With reference now to FIG. 4 of the drawings, a flowchart illustrating sample steps involved in a preferred implementation of the timer-based retransmission timeout of present invention is shown. In this embodiment, two timers are shown in the transmitter 200. Timer T_discard monitors the timeout of each SDU 210, and corresponds to the new discard timer 300, shown in FIG. 3 of the drawings, while Timer T_interval monitors the time interval between arriving SDUs 210.

When the data link layer 60a of the transmitter 200 receives an SDU 210 from the network layer 50a (step 400), the data link layer 60a checks whether the timer T_discard is active (step 405). If so, the data link layer 60a time stamps the received SDU 210 with the current value of the timer T_interval (step 410), and restarts the timer T_interval (step 415). Otherwise, the data link layer 60a initializes the timer T_discard with the default value of the timer T_discard (step 420), which can be the value included in the header 205 of the received SDU 210, and initializes the timer T_interval (step 425). Once the timer T_interval has been initialized (step 415 or 425), the data link layers 60a and 60b of the transmitter 200 and receiver 250, respectively, perform ARQ-related activities to ensure that the SDU 210 is received correctly by the receiver 250 (step 430). If the timer T_discard has not yet expired (step 435), and another SDU 210 is received by the data link layer 60a of the transmitter 200 (step 438), the process is repeated (step 400) until the timer T_discard expires (step 435).

Once the timer T_discard expires (step 435), the data link layer 60a checks whether the SDU 210 transmission was successful (step 440), e.g., all PDUs 220 carrying that SDU 210 have been acknowledged. If the SDU 210 transmission was not successful (step 440), the data link layer 60a discards the SDU 210 (step 445), and sends the "move receiving window" request message 280 to the receiver 250 (step 450). After the request message 280 is sent to the receiver 250 (step 450), or if the SDU 210 transmission was successful (step 440), the data link layer 60a of the transmitter 200 checks whether there is a time stamped SDU 210 in the transmit buffer 230 (step 455). If so, the data link layer 60a restarts the timer T_discard with the value of the time stamp of the SDU 210 (step 460), and awaits the next SDU 210 (step 400). Otherwise, the data link layer 60a resets the timer T_interval (step 465), and awaits the next SDU 210 (step 400).

Figure 5:
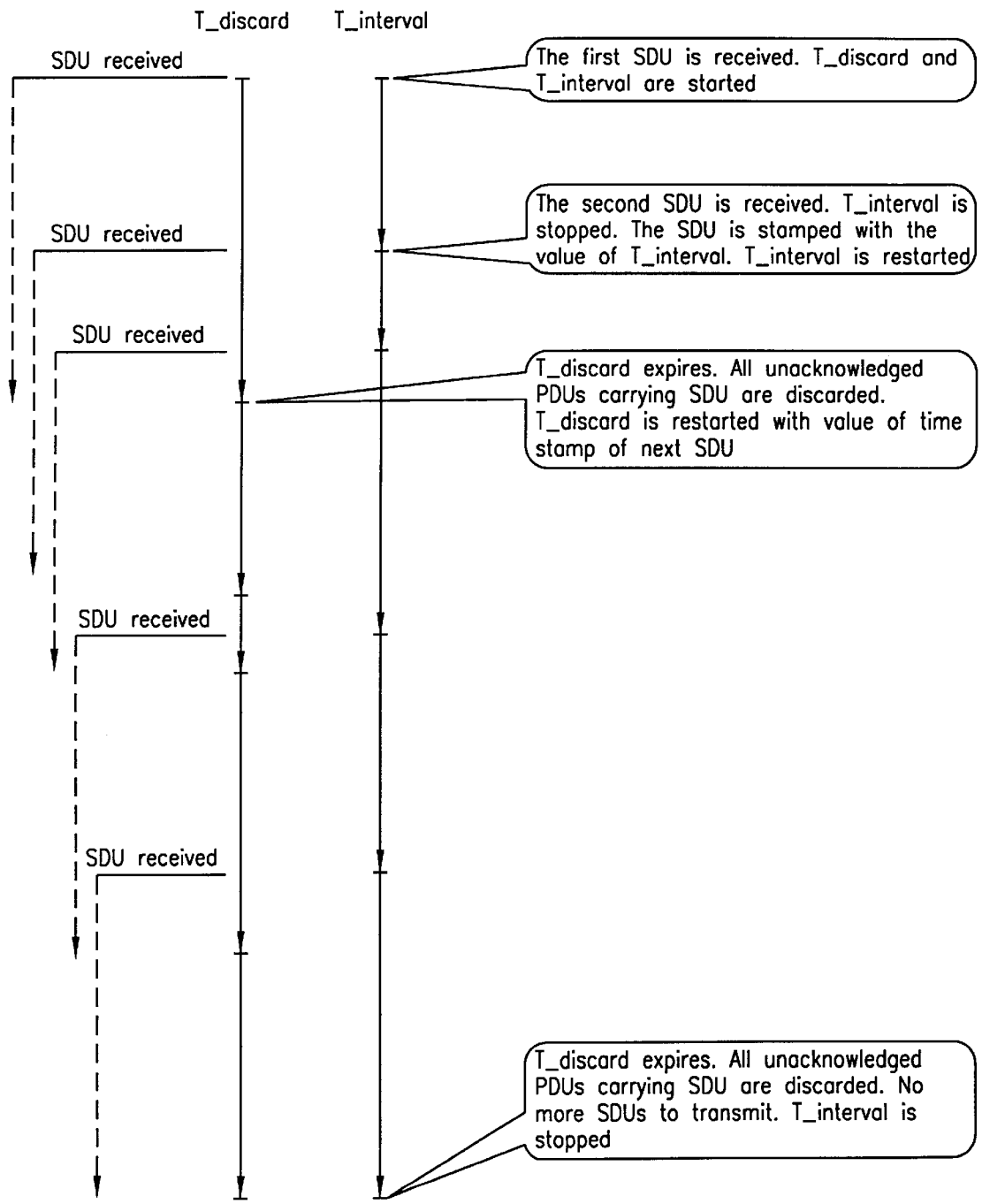
FIG. 5 illustrates a sample operation of the timers involved in the semi-reliable retransmission protocol of the present invention.

With reference now to FIG. 5 of the drawings, an example of the operation of the two timers T_discard and T_interval discussed in connection with the flow chart of FIG. 4 is shown. When the first SDU 210 is received, both timers T_discard and T_interval are initialized. Thereafter, if a second SDU 210 is received before the timer T_discard expires, the timer T_interval is stopped, the second received SDU 210 is stamped with the value of timer T_interval and the timer T_interval is restarted. Once the timer T_discard expires, all unacknowledged PDUs 220 carrying that SDU 210 are discarded, and the timer T_discard is restarted with the value of the time stamp of the second SDU 210. If there are no more SDUs 210 to transmit, the timer T_interval is stopped.

In order to avoid frequent timer T_discard operations for connections carrying small SDUs 210, the time stamps of the SDUs 210 should preferably be updated each time PDUs 220 are acknowledged from the receiver 250. Once an SDU 210 has been acknowledged, the value of its time stamp is removed and added to the next unacknowledged SDU 210 in the sequence. Therefore, the timer T_discard will not be operated for SDUs 210 that have already been acknowledged from the receiver 250.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for transmitting data packets using a semi-reliable retransmission protocol that utilizes selective repeat automatic repeat request, comprising:

a transmitter having a data link layer therein for receiving a service data unit containing a plurality of said data packets, said data link layer segmenting said service data unit into at least one protocol data unit;

a discard timer within said transmitter for monitoring a retransmission time of said at least one protocol data unit, said discard timer being initialized when said service data unit is received by said data link layer; and a receiver for receiving said at least one protocol data unit from said transmitter over an air interface and transmitting an acknowledgment message to said transmitter over said air interface after determining that said at least one protocol data unit is received correctly, said service data unit being discarded by said transmitter and said receiver when said acknowledgment message is not transmitted for said at least one protocol data unit and said discard timer expires.

2. The telecommunications system of claim 1, wherein said transmitter further comprises:

a network layer for transmitting said service data unit to said data link layer; and a physical layer for receiving said at least one protocol data unit from said data link layer and transmitting said at least one protocol data unit to said receiver over said air interface.

3. The telecommunications system of claim 1, wherein said receiver further comprises:

a physical layer for receiving said at least one protocol data unit from said transmitter over said air interface;

a data link layer for receiving said at least one protocol data unit from said physical layer, transmitting said acknowledgment message for each said at least one protocol data unit that is received correctly, and assembling said at least one protocol data unit back into said service data unit; and a network layer for receiving said service data unit from said data link layer.

4. The telecommunications system of claim 1, wherein said transmitter further comprises:

a transmit buffer for storing said at least one protocol data unit until said acknowledgment message is received for each said at least one protocol data unit or until said discard timer expires.

5. The telecommunications system of claim 1, wherein said transmitter further comprises:

means for transmitting a "move receiving window" request message to said receiver when said discard timer expires and said acknowledgment message for each said at least one protocol data unit has not been received.

6. The telecommunications system of claim 5, wherein said receiver further comprises:

a receiver buffer for storing said at least one protocol data unit, said at least one protocol data unit being removed from said receiver buffer when said "move receiving window" request message is received.

7. The telecommunications system of claim 6, wherein said transmitter further comprises:

a receive timer for monitoring a reception time of said "move receiving window" request message, said receive timer being initialized when said "move receiving window" request message is transmitted by said transmitter, said transmitter retransmitting said "move receiving window" request message to said receiver if said receiver timer expires and a "move receiving window" acknowledgment message has not been received by said transmitter.

8. The telecommunications system of claim 1, wherein said service data unit has a header associated therewith, said header having a dedicated field therein for storing a default value for said discard timer.

9. The telecommunications system of claim 8, wherein said default value is based on a maximum retransmission delay allowable for data within said data packets.

10. The telecommunications system of claim 1, further comprising:
an interval timer within said transmitter for monitoring a time interval between an arrival time of said service data unit at said data link layer and an arrival time of a successive service data unit at said data link layer, said interval timer being first initialized when said service data unit is received by said data link layer, said successive service data unit being time stamped with the current value of said interval timer when said successive service data unit is received by said data link layer and said discard timer has not expired.

11. A transmitter for transmitting data packets over an air interface to a receiver using a semi-reliable retransmission protocol that utilizes selective repeat automatic repeat request, comprising:
a data link layer for receiving a service data unit containing a plurality of said data packets, said data link layer segmenting said service data unit into at least one protocol data unit; and
a discard timer for monitoring the retransmission time of said at least one protocol data unit to said. receiver, said discard timer being initialized when said service data unit is received by said data link layer, said service data unit being discarded by said data link layer when an acknowledgment message is not received for each said at least one protocol data unit and said discard timer expires.

12. The transmitter of claim 11, further comprising:
a network layer for transmitting said service data unit to said data link layer; and
a physical layer for receiving said at least one protocol data unit from said data link layer and transmitting said at least one protocol data unit to a receiver over said air interface.

13. The transmitter of claim 11, further comprising:
a transmit buffer for storing said at least one protocol data unit until said acknowledgment message is received for each said at least one protocol data unit or until said discard timer expires.

14. The transmitter of claim 11, further comprising:
means for transmitting a "move receiving window" request message to a receiver when said discard timer expires and said acknowledgment message for each said at least one protocol data unit has not been received.

15. The transmitter of claim 14, further comprising:
a receive timer for monitoring a reception time of said "move receiving window" request message, said receive timer being initialized when said "move receiving window" request message is transmitted by said transmitter, said transmitter retransmitting said "move receiving window" request message if said receiver timer expires and a "move receiving window" acknowledgment message has not been received by said transmitter.

16. The transmitter of claim 11, wherein said service data unit has a header associated therewith, said header including a dedicated field for storing a default value for said discard timer.

17. The transmitter of claim 16, wherein said default value is based on a maximum retransmission delay allowable for data within said data packets.

18. The transmitter of claim 11, further comprising:
an interval timer for monitoring the time interval between an arrival time of said service data unit at said data link layer and an arrival time of a successive service data unit at said data link layer, said interval timer being initialized when said service data unit is received by said data link layer, said successive service data unit being time stamped with the current value of said interval timer when said successive service data unit is received by said data link layer and said discard timer has not expired.

19. A method for transmitting data packets from a transmitter to a receiver over an air interface using a semi-reliable retransmission protocol that utilizes selective repeat automatic repeat request, comprising the steps of:
receiving, by a data link layer within said transmitter, a service data unit containing a plurality of said data packets;
segmenting, by said data link layer, said service data unit into at least one protocol data unit;
initializing a discard timer within said transmitter when said service data unit is received by said data link layer;
transmitting said at least one protocol data unit from said transmitter over said air interface to said receiver;
transmitting an acknowledgment message from said receiver to said transmitter over said air interface after determining that said at least one protocol data unit is received correctly; and
discarding said service data unit by said transmitter and said receiver when said acknowledgment message is not transmitted for said at least one protocol data unit and said discard timer expires.

20. The method of claim 19, further comprising the step of:
storing, in a transmit buffer within said transmitter, said at least one protocol data unit until said acknowledgment message is received for each said at least one protocol data unit or until said discard timer expires.

21. The method of claim 19, wherein said step of discarding further comprises the step of:
transmitting a "move receiving window" request message from said transmitter to said receiver when said discard timer expires and said acknowledgment message for each said at least one protocol data unit has not been received.

22. The method of claim 21, wherein said step of discarding further comprises the step of:
storing, within a receiver buffer within said receiver, said at least one protocol data unit; and
removing said at least one protocol data unit from said receiver buffer when said "move receiving window" request message is received.

23. The method of claim 22, wherein said step of discarding further comprises the steps of:
initializing a receive timer when said "move receiving window" request message is transmitted by said transmitter; and
retransmitting said "move receiving window" request message to said receiver if said receiver timer expires and a "move receiving window" acknowledgment message has not been received by said transmitter.

24. The method of claim 19, further comprising the steps of:

initializing an interval timer when said service data unit is received by said data link layer;

receiving a successive service data unit by said data link layer; and appending a time stamp to said successive service data unit received by said data link layer, said time stamp being the current value of said interval timer when said discard timer has not expired.

25. The method of claim 24, further comprising the steps of:

stopping said discard timer when said acknowledgment message for each of said at least two protocol data units associated with said service data unit are received by said transmitter or when said discard timer expires; and reinitializing said discard timer for said successive service data unit with a value of said time stamp.

26. A receiver for receiving data packets over an air interface from a transmitter using a semi-reliable retransmission protocol that utilizes a selective repeat automatic repeat request technique, comprising:

means for receiving at least one protocol data unit segmented from a service data unit containing a plurality of said data packets from said transmitter over said air interface;

means for transmitting an acknowledgment message to said transmitter over said air interface after determining that said at least one protocol data unit is received correctly;

means for requesting retransmission of each said at least one protocol data unit that is received incorrectly using said selective repeat automatic repeat request technique;

means for receiving a discard message from said transmitter when a discard timer monitoring the retransmission time of said at least one protocol data unit expires prior to the transmission of said acknowledgment message; and means for discarding said service data unit upon receipt of said discard message.

27. The receiver of claim 26, further comprising:

a receive buffer for storing said at least one protocol data unit, said at least one protocol data unit being removed from said receive buffer upon receipt of said discard message.

28. The receiver of claim 26, wherein said service data unit has a header associated therewith, said header having a dedicated field therein for storing a default value for said discard timer.

29. The receiver of claim 28, wherein said default value is based on a maximum retransmission delay allowable for data within said data packets.

30. A method for transmitting data packets over an air interface to a receiver using a semi-reliable retransmission protocol that utilizes selective repeat automatic repeat request, comprising:

segmenting a service data unit containing a plurality of said data packets into at least one protocol data unit;

initializing a discard timer for monitoring the retransmission time of said at least one protocol data unit to said receiver;

transmitting said at least one protocol data unit from said transmitter to said receiver over said air interface; and discarding said service data unit when an acknowledgment message is not received for each said at least one protocol data unit prior to the expiration of said discard timer.

31. The method of claim 30, further comprising the step of:

storing, in a transmit buffer within said transmitter, each said at least one protocol data unit until said acknowledgment message is received for each said at least one protocol unit or until said discard timer expires.

32. The method of claim 30, wherein said step of discarding further comprises the step of:

transmitting a discard message from said transmitter to said receiver upon expiration of said discard timer.

33. The method of claim 32, wherein said step of discarding further comprises the steps of:

initializing a receive timer upon transmission of said discard message; and retransmitting said discard message to said receiver if said receiver timer expires prior to receipt of a discard acknowledgment message from said receiver.

34. The method of claim 30, further comprising the steps of:

initializing an interval timer upon receipt of said service data unit by a data link layer within said transmitter;

receiving a successive service data unit by said data link layer; and appending a time stamp to said successive service data unit received by said data link layer, said time stamp being the current value of said interval timer when said discard timer has not expired.

35. The method of claim 34, further comprising the steps of:

stopping said discard timer when said acknowledgment message for each said at least one protocol data unit associated with said service data unit is received by said transmitter or when said discard timer expires; and reinitializing said discard timer for said successive service data unit with a value of said time stamp.

36. A method for receiving data packets over an air interface from a transmitter using a semi-reliable retransmission protocol that utilizes a selective repeat automatic repeat request technique, comprising the steps of receiving at least one protocol data unit segmented from a service data unit containing a plurality of said data packets from said transmitter over said air interface;

transmitting an acknowledgment message to said transmitter over said air interface after determining that said at least one protocol data unit is received correctly;

requesting retransmission of each said at least one protocol data unit that is received incorrectly using said selective repeat automatic repeat request technique;

receiving a discard message from said transmitter when a discard timer monitoring the retransmission time of said at least one protocol data unit expires prior to the transmission of said acknowledgment message; and discarding said service data unit upon receipt of said discard message.

37. The method of claim 36, further comprising the step of:

storing, within a receive buffer within said receiver, said at least one protocol data unit, said at least one protocol data unit being removed from said receive buffer upon receipt of said discard message.

* * * * *

UNITED STATES PATENT AND TRADEMARK OFFICE
CERTIFICATE OF CORRECTION

PATENT NO. : 6,519,223 B1
DATED : February 11, 2003
INVENTOR(S) : Stefan Henrik Andreas Wager et al.

It is certified that error appears in the above-identified patent and that said Letters Patent is hereby corrected as shown below:

<u>Title page,</u>
Item [75], Inventors, replace "Helsinki" with -- Helsingfors --
Item [57], ABSTRACT,
Line 12, replace "received a timer" with -- received, a timer --
Line 14, replace "packet this data" with -- packet, this data --

<u>Column 4,</u>
Line 13, replace "refers S to" with -- refers to --

<u>Column 12,</u>
Line 42, replace "steps of" with -- steps of: --

Signed and Sealed this

Twenty-second Day of July, 2003

JAMES E. ROGAN
*Director of the United States Patent and Trademark Office*